(12) United States Patent
Sun et al.

(10) Patent No.: US 8,828,608 B2
(45) Date of Patent: Sep. 9, 2014

(54) SECONDARY LITHIUM BATTERIES HAVING NOVEL ANODES

(75) Inventors: Xueliang Sun, London (CA); Xifei Li, London (CA); Dongsheng Geng, London (CA); Quanmin Yang, Mississauga (CA)

(73) Assignee: Springpower International Inc., Mississauga, ON (CA)

( * ) Notice: Subject to any disclaimer, the term of this patent is extended or adjusted under 35 U.S.C. 154(b) by 0 days.

(21) Appl. No.: 13/337,182

(22) Filed: Dec. 26, 2011

(65) Prior Publication Data

US 2012/0177995 A1    Jul. 12, 2012

Related U.S. Application Data

(60) Provisional application No. 61/430,252, filed on Jan. 6, 2011.

(51) Int. Cl.

| | | |
|---|---|---|
| *H01M 4/13* | (2010.01) | |
| *B82Y 30/00* | (2011.01) | |
| *H01M 4/583* | (2010.01) | |
| *H01M 4/36* | (2006.01) | |
| *H01M 4/587* | (2010.01) | |
| *H01B 1/04* | (2006.01) | |
| *H01M 10/0525* | (2010.01) | |
| *H01M 4/02* | (2006.01) | |
| *H01M 4/62* | (2006.01) | |
| *H01M 10/0565* | (2010.01) | |

(52) U.S. Cl.
CPC ........... *H01B 1/04* (2013.01); *H01M 2004/027* (2013.01); *H01M 4/623* (2013.01); *H01M 10/0565* (2013.01); *B82Y 30/00* (2013.01); *H01M 4/583* (2013.01); *Y02T 10/7011* (2013.01); *H01M 4/364* (2013.01); *H01M 4/366* (2013.01); *H01M 4/587* (2013.01); *Y02E 60/122* (2013.01); *H01M 10/0525* (2013.01); *H01M 2004/021* (2013.01)
USPC ........................ 429/231.8; 429/209; 429/218.1

(58) Field of Classification Search
USPC ..................... 429/231.8, 209, 218.1
See application file for complete search history.

(56) References Cited

U.S. PATENT DOCUMENTS

| | | | |
|---|---|---|---|
| 2010/0173198 A1* | 7/2010 | Zhamu et al. | 429/222 |
| 2011/0127471 A1* | 6/2011 | Shin et al. | 252/506 |
| 2011/0163298 A1* | 7/2011 | Sung | 257/29 |

FOREIGN PATENT DOCUMENTS

CN          101800310 A  *  8/2010

OTHER PUBLICATIONS

D. Y. Pan, S. Wang, B. Zhao, M. H. Wu, H. J. Zhang, Y. Wang, Z. Jiao, Chem. Mater. 2009, 21, 3136.
G. X. Wang, X. P. Shen, J. Yao, J. S. Park, Carbon 2009, 47, 2049.
D. Y. Zhang, G. Y. Zhang, S. Liu, E. G. Wang, Q. Wang, H. Li, X. J. Huang, Appl. Phys. Lett. 2001, 79, 3500.
Y. P. Wu, C. Y. Jiang, C. R. Wan, S. B. Fang, Y. Y. Jiang, J Appl Polym Sci. 2000, 77, 1735.

(Continued)

*Primary Examiner* — Jane Rhee
(74) *Attorney, Agent, or Firm* — Manelli Selter PLLC; Edward J. Stemberger (57) ABSTRACT

A secondary lithium battery having an anode comprising graphene nanosheets doped with a doping element selected from the group consisting of nitrogen, boron, sulfur, phosphorous and combinations thereof. The secondary lithium battery and the anode provide capacity and other performance without degradation during long term charge and discharge cycling.

10 Claims, 7 Drawing Sheets

(56) References Cited

OTHER PUBLICATIONS

X. R. Wang, X. L. Li, L. Zhang, Y. Yoon, P. K. Weber, H. L. Wang, J. Guo, H. J. Dai, Science 2009, 324, 768.

M. J. McAllister, J. L. Li, D. H. Adamson, H. C. Schniepp, A. A. Abdala, J. Liu, M. Herrera-Alonso, D. L. Milius, R. CarO, R. K. Prudhomme, I. A. Aksay, Chem. Mater. 2007, 19.

J. Casanovas, J. M. Ricart, J. Rubio, F. Illas, J. M. Jimenez-Mateos, J. Am. Chem. Soc. 1996, 118, 8071.

H. C. Choi, J. Park, B. N. Kim, J. Phys. Chem. B 2005, 109, 4333.

M. Terrones, P. Redlich, N. Grobert, S. Trasobares, W. K. Hsu, H. Terrones, Y. Q. Zhu.

Y. P. Wu, S. B. Fang, W. G. Ju, Y. Y. Jiang, J. Power Sources 1998, 70, 114.

K. Naoi, N. Ogihara, Y. Igarashi, A. Kamakura, Y. Kusachi, K. Utsugi, J Electrochem Soc. 2005, 152, A1047.

V. A. Sethuraman, L. J. Hardwick, V. Srinivasan, R. Kostecki, J. Power Sources 2010, 195, 3655.

A. V. Murugan, T. Muraliganth, A. Manthiram, Chem. Mater. 2009, 21, 5004.

\* cited by examiner

SECONDARY LITHIUM BATTERIES HAVING NOVEL ANODES

FIELD OF THE INVENTION

This invention relates to secondary lithium batteries having novel anodes, said anodes and methods of manufacture of said batteries and anodes.

BACKGROUND OF THE INVENTION

Lithium ion batteries are one of the great successes of modern materials electrochemistry. They have gained dominance in portable electronics applications due to their advantages in working voltage and energy density over traditional secondary nickel based batteries and lead acid batteries. Although significant progress has been made since commercialization in early 1990's, lithium ion batteries today still require significant improvement of both cathode and anode materials in capacity, rate, cost, and safety to meet demand for automotive applications such as electric vehicles and gas-electric hybrid vehicles.

Secondary lithium batteries include three types of lithium batteries that basically use similar cathode and anode materials but differ in electrolyte as follows:
(1) lithium-ion (Li-ion) batteries which use liquid, organic electrolyte;
(2) lithium polymer batteries which use polymer or gelled electrolyte; and
(3) solid lithium batteries which use only solid electrolyte, (not gelled) usually inorganic solid electrolyte or sometimes polymer electrolyte.

All commercial secondary lithium batteries have an anode with a binder and a current collector substrate. The binder is used to bind the active materials particles and any conductivity additives. In their manufacture, usually a slurry containing the active material, a binder, a conductivity additive, such as carbon black and a solvent is coated on the substrate current collector of the electrode. Drying and compression of the slurry produces the electrode.

Many other anode materials, such as high capacity Si-based materials and Sn-based materials have been intensively investigated and some of them have been commercialized on a small scale. However, challenges still remain in their cycle life, e.g. concerning capacity and performance degradation during the charge and discharge cycles.

On the other hand, in addition to the great success of traditional graphite and various natural and synthesized carbon-based anode materials, nano carbon materials have attracted also much interest. Nano carbon materials, including carbon nanotubes and fullerene have already been investigated to increase the specific capacities of anodes for secondary lithium batteries. Graphene is a new class and two-dimensional (one-atom-thickness) carbon allotrope arranged in a hexagonal lattice with very strong $sp^2$-hybridized bonds different from sphere-like fullerene and one-dimensional carbon nanotubes. Graphene has attracted great interest in both fundamental science and applied research since the isolation of single graphene sheets via mechanical exfoliation in 2004. Graphene has various remarkable properties, for example, an ultra-high surface area (2630 $m^2g^{-1}$), high electrical conductivity (resistivity: $10^{-6}$ Ωcm) and high chemical stability that are superior to those of carbon nanotubes (CNTs) and graphite[1,2]. Recent work has shown that graphene as anode of lithium ion batteries has higher capacity over commercial graphite. While many efforts have focused on improvement of initial capacity of graphene anodes, little attention has been paid to their long term cycling stability. In fact, capacity and performance degradation during cycling remains an issue for these electrodes.

Doping of heteroatom into carbon structures can tailor both chemical and electronic nature. Nitrogen doping was reported to enhance $Li^+$ intercalation/de-intercalation in carbon nanotubes[3] and increase electrochemical capacity of nitrogen-containing polymeric carbon[4]. However, it is unknown whether or not nitrogen doped graphene can be used as anode of secondary lithium batteries and the impact of nitrogen doping on the electrochemical performance of graphene as an anode material.

Furthermore, there is a significant need, however, for providing anode materials for use in secondary lithium batteries and secondary lithium batteries having long term improved stability for use in secondary lithium batteries without performance degradation.

SUMMARY OF THE INVENTION

The present invention provides secondary lithium batteries and anodes having long term stability without performance degradation. Furthermore, the performance, such as capacity, of the said secondary lithium batteries and anodes significantly increases improved capacity, i.e. stored electrical charge while reducing performance degradation of the anode during charge and discharge cycling.

The anode materials in the use of the invention have enhanced performance in that their capacity increases with charge and discharge cycles. The anode active material comprise of graphene nanosheets doped by nitrogen, boron, sulfur, phosphorous or their combinations, referred to as M-GNS where M stands for N, B, S, P, or their combinations.

Accordingly, in one aspect the invention provides a secondary lithium battery having an anode comprising graphene nanosheets doped with a doping element selected from the group consisting of nitrogen, boron, sulfur, phosphorous and combinations thereof.

Preferably, the doped graphene nanosheets comprise a monolayer or multi-layer graphene.

The doped graphene sheets are most preferably agglomerated as a body in the form of a sheet, sphere or rod. The doped graphene nanosheets preferably comprise 0.001 molar % to 30 molar % of the doping element on a graphene basis.

The anode of use in the battery of the invention preferably comprises a conductive substrate, generally a metallic foil, coated with the M-GNS, a binder, for example polyvinylidene fluoride, with or without a conductivity additive.

The battery as hereinabove defined may be selected from a secondary lithium ion battery, secondary solid lithium battery and secondary lithium polymer battery.

In a further aspect the invention provides an anode as hereinabove defined.

In yet a further aspect the invention provides a process for making an anode as hereinabove defined comprising mixing M-GNS with a binder, and more specifically comprising (i) coating a slurry comprising said M-GNS, a binder, an optional conductivity additive (M-GNS has good electrical conductivity and does not need additional conductivity additive in most applications), and a solvent on a current collector or substrate; and (ii) drying and calendering said coating on the current collector or substrate.

Thus, the active material M-GNS can be agglomerated to sheets, spheres, rods or any other forms that can be used to make anode of secondary lithium batteries, according to the invention. Since graphene nanosheets have a size of nanometers in thickness and difficult to be used in practical battery manufacturing processes, the particles or nanosheets are agglomerated during the fabrication process or in post synthesis processes to form particles at the micrometer level. These particles can be in the shape of sphere, sheets, rods or any other form. The agglomerated graphene nanosheets form morphology like cramped paper as seen in scanning electron microscope (SEM) images in its fabrication process.

The M-GNS per se can be manufactured by published processes, such as thermochemical reactions of GNS with ammonia for N-GNS[5], plasma treatment of GNS in nitrogen for N-GNS, plasma treatment of GNS in the presence of ammonia also for N-GNS, plasma treatment of GNS in boron or nitrogen containing gases, or other known processes.

To make a secondary lithium battery, the anode of use in the invention as hereinabove defined and a cathode, separated by a separator, form an electrode assembly. The said electrode assembly is rolled into a cylindrical form and then inserted into a cylindrical battery housing. Electrolyte is then filled into the separator and the pores of the electrodes and the battery housing is sealed to form the final cylindrical battery. The above electrode assembly can also be rolled into a prismatic form and inserted into a prismatic housing to form a prismatic secondary lithium battery. The cathode can be made of any commercial cathode materials such as layered oxides, e.g. $LiCoO_2$, $Li(NiMnCo)O_2$, $Li(NiCoAl)O_2$, etc, a polyanion e.g. $LiFePO_4$, and spinels, e.g. $LiMn_2O_4$, or sulfur or air cathodes and the like. The electrolyte can be $LiPF_6$ salt dissolved in organic carbonate or any other commercial electrolyte including ionic electrolyte. Typical non-aqueous liquid electrolyte is a mixture of organic carbonates such as ethylene carbonate or diethyl carbonate with lithium salts such as $LiPF_6$, $LiClO_4$, $LiBF_4$, and the like.

The anode can also be used in secondary lithium polymer batteries or solid secondary lithium batteries wherein the electrolyte can be Li conducting polymer materials or lithium conducting, solid inorganic materials, respectively.

BRIEF DESCRIPTION OF THE DRAWINGS

In order that the invention can be better understood, preferred embodiments will now be described by way of example only, with reference to the accompanying drawings, wherein FIG. 1 are scanning electron microscope (SEM) images of (a) GNS and (b) N-GNS and transmission electronic microscope (TEM) images of (c) GNS and (d) N-GNS, according to the prior art.

DETAILED DESCRIPTION OF PREFERRED EMBODIMENTS

Examples

Synthesis of Graphene Nanosheets (GNS):

Graphene oxide was first prepared by the modified Hummers method[5] as described below.

Graphite powder (1 g) was mixed with concentrated $H_2SO_4$ (23 mL), and stirred at room temperature for 0.5 h. $NaNO_3$ (0.5 g) was added into the mixture and left overnight. Then, the reaction vessel was immersed in an ice water bath, and $KMnO_4$ (3 g) was added slowly and stirred for 2 h. Subsequently, the mixture was stirred at 35±3° C. for 3 h. After the dilution with DI water (46 mL), 30% $H_2O_2$ was added to the mixture, and the color of mixture changed into brilliant yellow along with violent bubbling. Finally, the mixture was filtered and washed with HCl aqueous solution to remove residual metal ions, then washed with DI water until pH=7. The slurry was dried in air. The resulting solid (graphene oxide) was inserted into a quartz tube in an argon atmosphere. The quartz tube was quickly inserted into a preheated furnace at 1050° C. for 30 s. This treatment is used to promote exfoliation of the graphene sheets and reduce the oxygen moieties[6].

Synthesis of Nitrogen Doped Graphene (N-GNS):

The $NH_3$ annealing process was used to synthesize N-GNS[5]. GNS samples were put in a quartz boat in the center of a tube furnace. After flowing the mixture of Ar and $NH_3$ (v/v, 9:1) for about 30 minutes, the tube furnace was heated up to 900° C. for 10 min. Then the tube furnace was cooled down in an Ar atmosphere. The samples were taken out of the tube reactor after the furnace temperature was below 50° C.

Characterization:

The morphologies for GNS and N-GNS were performed by a field emission scanning electron microscope (SEM) (Hitachi S-4800) and transmission electron microscopy (TEM) (Philips CM10). Raman spectra were conducted using a Raman microspectrometer at room temperature with green laser as the exciting radiation equipped with an optical microscope. Cyclic voltammetry tests were performed on CHI Electrochemistry workstation at a scan rate of 0.1 $mV\ s^{-1}$ over a potential range of 0.01 to 3.0 V (vs. $Li/Li^+$). Charge-discharge characteristics were tested galvanostatically between 0.01 and 3.0V (vs. $Li/Li^+$) at room temperature using an Arbin BT-2000 Battery Test System.

Electrochemical Testing:

Working electrodes were prepared by slurry casting on a Cu foil as current collector. The slurry contains the active material (GNS or N-GNS) (90 wt % on dry solids basis) and a polyvinylidene fluoride binder (10 wt % on dry solids basis) in N-methylpyrrolidinone (NMP) solvent. The electrodes were dried in a vacuum at 110° C. overnight. The electrolyte was composed of 1 M $LiPF_6$ salt dissolved in ethylene carbonate (EC): diethyl carbonate (DEC): ethyl methyl carbonate (EMC) at 1:1:1 volume ratio. Lithium foil was used as a counter electrode. CR-2325-type coin cells were assembled in a glove box under dry argon atmosphere (moister and oxygen concentration <1 ppm).

Figure 1:
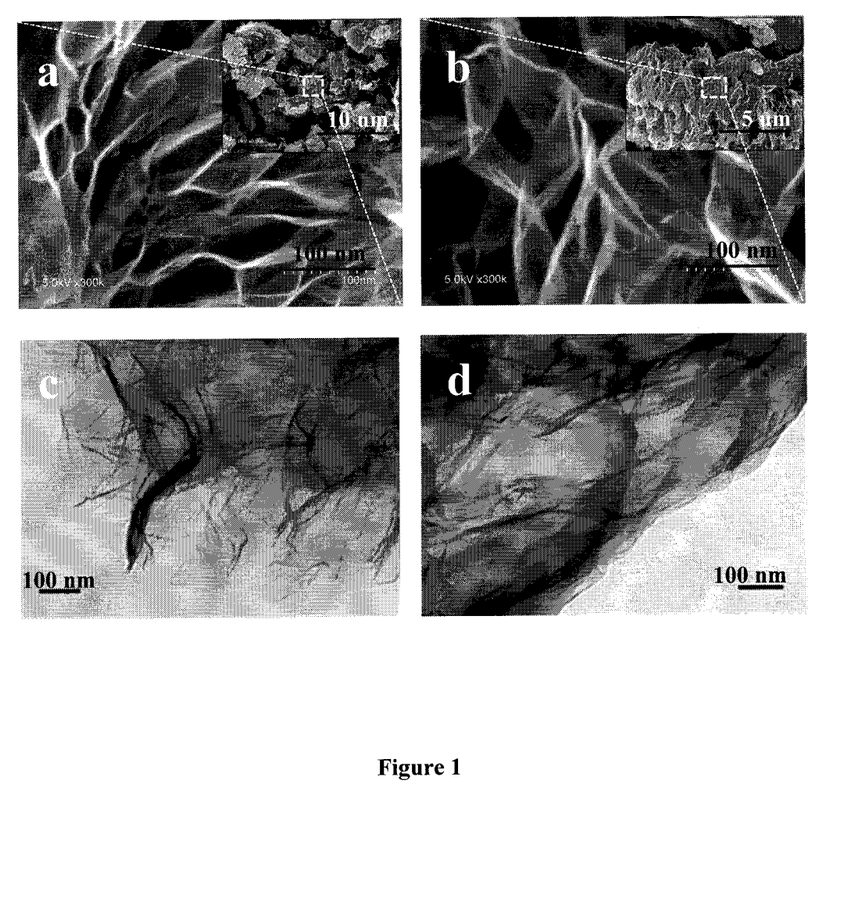

Anode material nitrogen doped graphene nanosheets (N-GNS) of use in the practice of the invention is shown in FIG. 1b and 1d along with its precursor material graphene nanosheets (GNS) in FIG. 1a and 1c.

X-ray Photoelectron Spectra (XPS) was employed to analyze the compositional change of graphene before and after nitrogen doping. Based on XPS spectra, the estimated composition of N-GNS is 95.5% C, 1.2% N, and 3.3% O, whereas its precursor GNS has 96.8% C, 0% N, and 3.2% O. The N 1s signal splits into two peaks at 399.02 and 402.10 eV. They correspond to two types of doping nitrogen, i.e. pyridinic nitrogen and graphitic nitrogen[7]. The area percentage of pyridine-like and graphite-like nitrogen is 75.4 and 24.6, respectively. It shows that the graphite-like nitrogen structure is more abundant than the pyridine-like nitrogen structure that has lower degree of crystalline perfection[8]. During the formation of pyridinic nitrogen, carbon vacancies are formed within a predominantly hexagonal graphene network[9]. These vacancies increase the $Li^+$ storage sites, resulting in the capacity increase of N-GNS anode[10].

Figure 2:
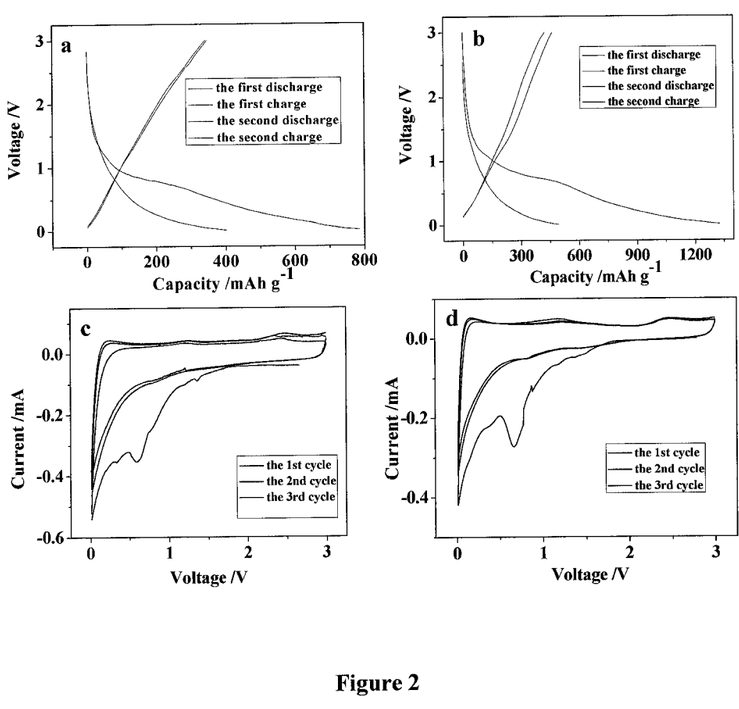
FIG. 2 are charge/discharge profiles of anode made of (a) GNS and (b) N-GNS at a current density of 100 $mAg^{-1}$ in a voltage range of 0.01-3V; cyclic voltammograms of anode made of (c) GNS and (d) N-GNS at a scan rate of 0.1 $mV\ s^{-1}$ in a voltage range of 0.01-3V.

FIG. 2(a) and (b) show the first two cycles charge (de-intercalation)/discharge (intercalation) profiles of GNS anode and N-GNS anode, respectively, in the voltage range of 0.01-3.0 V vs. $Li^+/Li$ at current density of 100 $mAg^{-1}$. Both curves of GNS and N-GNS anodes present a similar Li intercalation/de-intercalation profile. The presence of the plateau at about 0.6 V is assigned to the formation of a solid-electrolyte-interphase (SEI) film[11,12]. The capacity of the potential region lower than 0.5 V is due to $Li^+$ intercalation into the graphene layers[13]. They show no distinct potential plateaus, different from that of well crystalline graphite anode. The absence of a potential plateau suggests electrochemically and geometrically nonequivalent Li sites. In the first cycle of GNS anode, the discharge and charge capacities are 786 and 401 $mAhg^{-1}$, respectively, whereas for N-GNS anode, the corresponding capacities increase to 1327 and 495 $mAhg^{-1}$, respectively. A higher reversible capacity was obtained for N-GNS although accompanying a higher irreversible capacity.

The cyclic voltammetry (CV) profiles of GNS and N-GNS anodes were recorded in voltage range of 0.01-3.0 V vs $Li/Li^+$ at a sweep rate of 0.1 $mVs^{-1}$. Both GNS and N-GNS exhibit similar CV behaviors, highlighting nitrogen doping graphene nanosheets have no obvious influence on initial Li intercalation/de-intercalation. The first reduction in the discharge sweep of both electrodes in FIGS. 2c and 2d gives a prominent peak locating at about 0.6 V due to the formation of SEI films on the anodes. This peak disappears during subsequent discharge, which is attributed to the isolation of the anode from electrolyte by the dense SEI film formed in first discharge. Evidently, the peak related to SEI film is larger for N-GNS than that of GNS. It is in good agreement with the higher irreversible capacity found in N-GNS anode in first charge and discharge. N-GNS has higher specific surface area than GNS, 599 $m^2g^{-1}$ versus 456 $M^2g^{-1}$, and therefore it consumes more lithium in SEI formation leading to higher irreversible capacity in first charge and discharge cycle.

Figure 3:
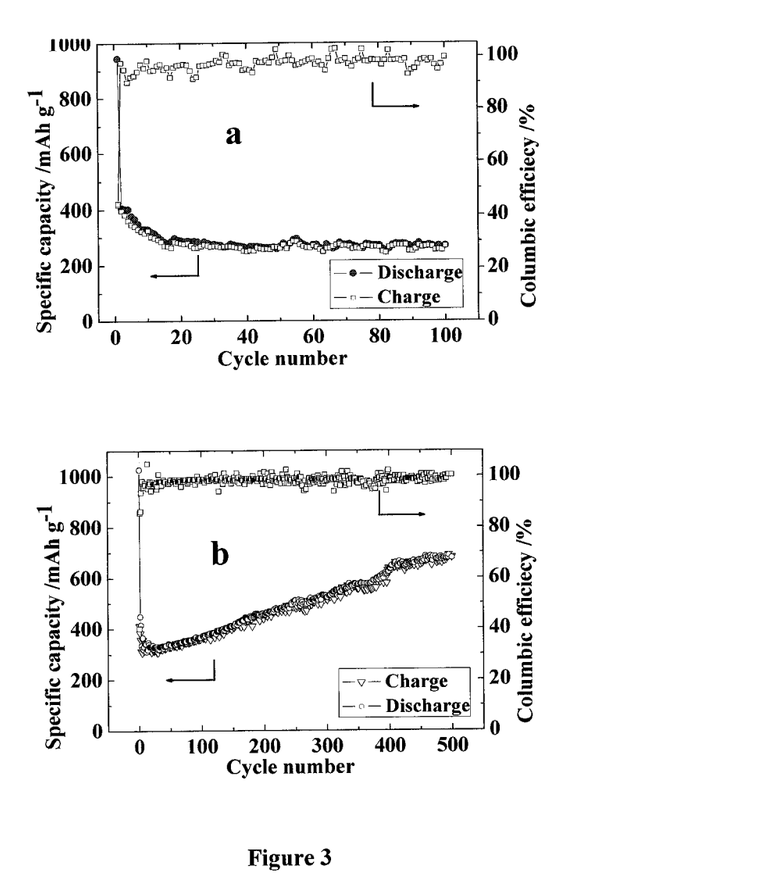
FIG. 3 shows graphs of reversible charge/discharge capacity versus cycle number at current density of 100 $mA\ g^{-1}$ in a voltage range of 0.01-3V of anode made of (a) GNS and (b) N-GNS.

The cycling stability of GNS and N-GNS anodes is presented in FIG. 3. GNS shows regular cycling performance, i.e. gradual declining in specific capacity with charge/discharge cycles. The discharge capacity after 100 cycles dropped from 407 $mAhg^{-1}$ to 269 $mAhg^{-1}$, a retention of 66%. For N-GNS, a higher discharge capacity of 454 $mAhg^{-1}$ was observed in the second cycle. After a slight decline in first 17 cycles, the capacity increases during further cycling and reached 684 $mAhg^{-1}$ after 500 cycles.

Figure 4:
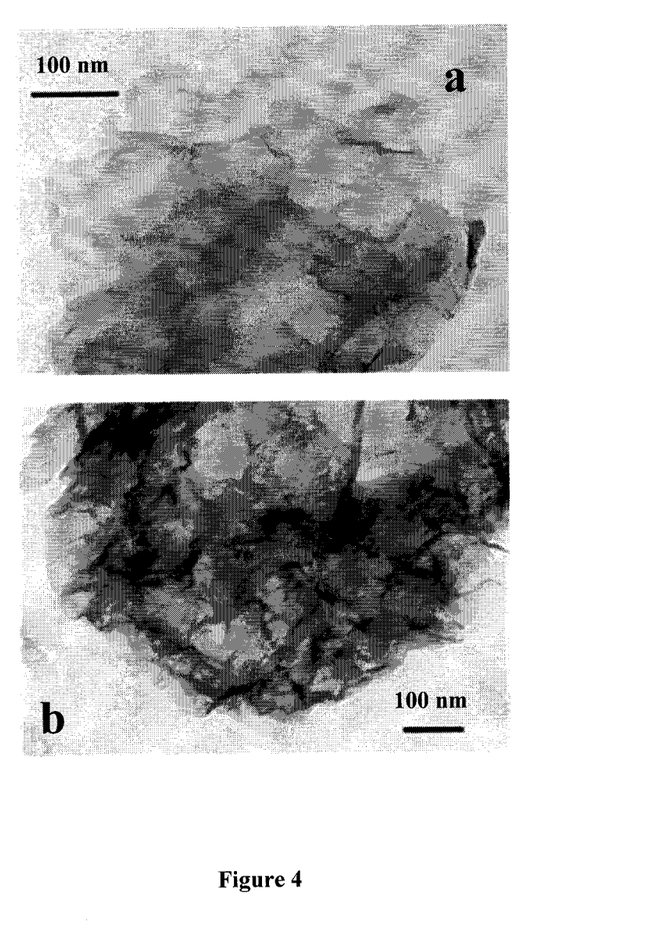
FIG. 4 is TEM images of (a) GNS and (b) N doped GNS after 100 cycles in an anode electrode.

After testing 100 cycles in cells, the GNS and N-GNS anodes were harvested and washed for TEM observation. The results were presented in FIG. 4. Both images still show the graphene nanosheets entangled with each other resembling crumpled paper. It is obvious that N-GNS can better keep the original structure during charge and discharge process in comparison to GNS.

Figure 5:
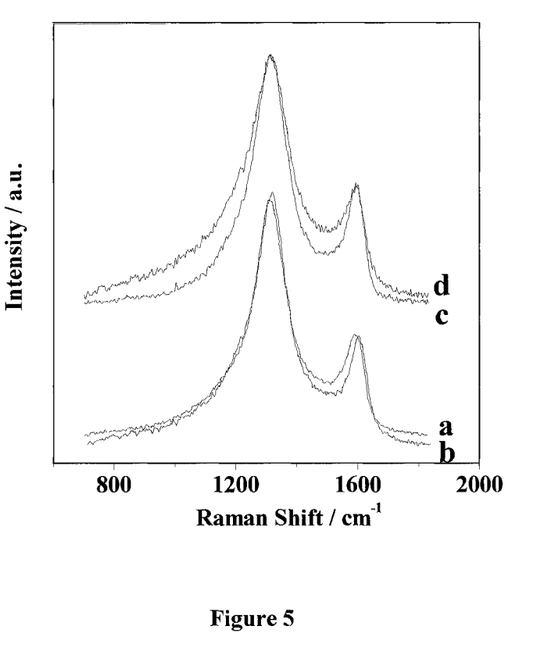
FIG. 5 shows Raman spectra of GNS before (a) and after (b) 100 cycles and N-GNS before (c) and after (d) 100 cycles.

Raman spectra of GNS and N-GNS before and after charge/discharge cycles are given in FIG. 5. All spectra show two obvious peaks, the G band with $E_{2g}$ symmetry at around 1595 $cm^{-1}$ and the D band with $A_{1g}$ symmetry at about 1310 $cm^{-1}$ that are originated from the Raman active in-plane tangential stretching mode of carbon-carbon bonds in highly oriented pyrolytic graphite and disorder induced features due to the finite particle size effect or lattice distortion, respectively. Clearly, there is a big difference in the Raman spectra of N-GNS before and after 100 cycles whereas no significant difference was found for that of GNS. In order to compare the structural changes before and after 100 cycles, a critical factor ($I_D/I_G$), the integrated intensity ratio of D band and G band was obtained as a measure of the disorder degree of graphene. $I_D/I_G$ value of GNS is 5.6 and 6.2 before and after 100 cycles, respectively. However, $I_D/I_G$ value of N-GNS increased from 5.8 to 8.8 after cycling. For N-GNS, clearly, the intensity growing of the disorder-induced D-band at 1310 $cm^{-1}$ (relative to the G band) indicates that $Li^+$ intercalation/de-intercalaton into graphene sheets upon cycling brings about a more noticeable change in the degree of long-range ordering in the hexagonal lattice than that of GNS. N-GNS have more and more disordered structures, such as defects, with charge/discharge process. These defect sites in N-GNS provide more $Li^+$ storage electrochemical active location. Therefore, the capacity of N-GNS increases with cycles.

Figure 6:
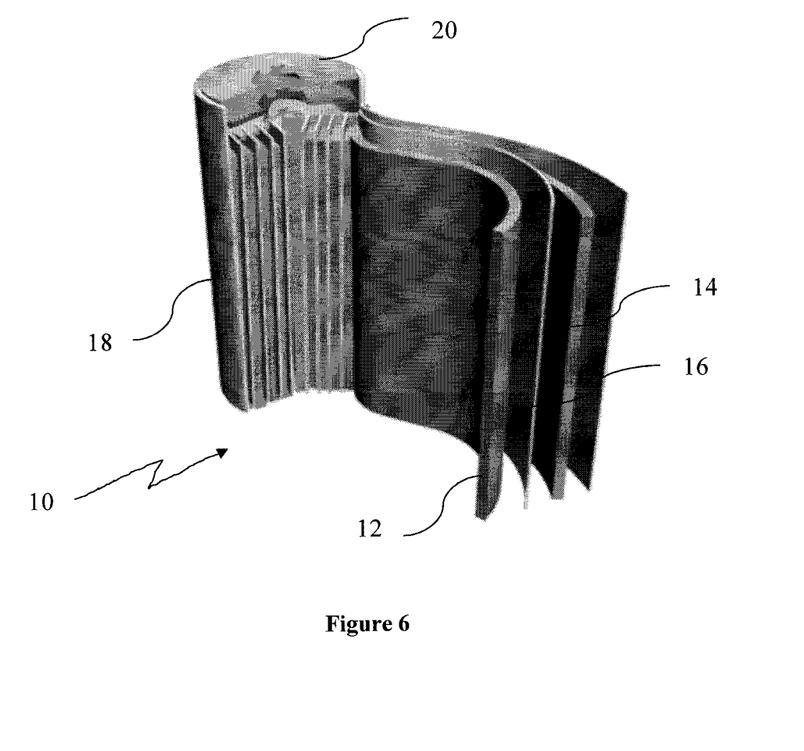
FIG. 6 is an exploded perspective view of a secondary lithium battery according to the invention.
Figure 7:
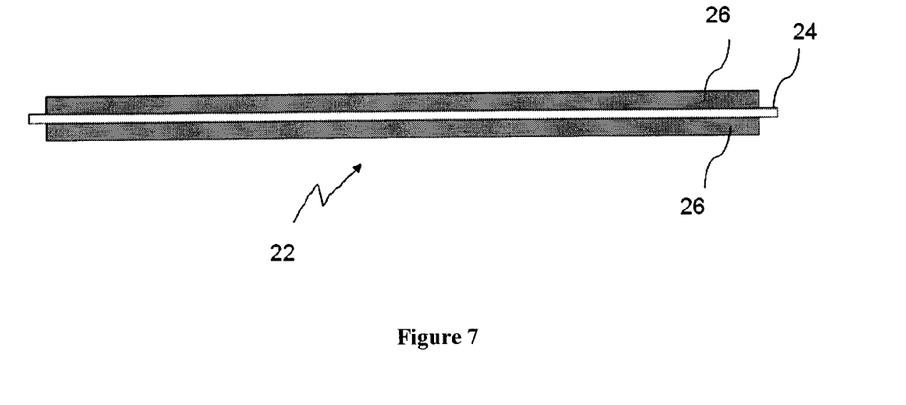
FIG. 7 is a diagrammatic horizontal cross-section of an anode of use in the battery of FIG. 6.

FIG. 6 shows generally as 10 a secondary lithium battery having a plurality of cathodes 12 separated from anodes 14 by separators 16 formed of a porous material comprising a non-aqueous electrolyte, within housing 18 and having a top cap 20. Anode 22 has an aluminum current collector 24 coated with active material coating 26 comprising M-GNS and a binder material (FIG. 7).

Alternative secondary lithium batteries may be prepared wherein separator 16 is a lithium ion conducting polymer as in a secondary lithium polymer battery, or a solid, lithium ion conducting inorganic or organic material as in a solid secondary lithium battery.

PUBLICATIONS

[1] D. Y. Pan, S. Wang, B. Zhao, M. H. Wu, H. J. Zhang, Y. Wang, Z. Jiao, *Chem. Mater.* 2009, 21, 3136.

[2] G. X. Wang, X. P. Shen, J. Yao, J. S. Park, *Carbon* 2009, 47, 2049.

[3] D. Y. Zhang, G. Y. Zhang, S. Liu, E. G. Wang, Q. Wang, H. Li, X. J. Huang, *Appl. Phys. Lett.* 2001, 79, 3500.

[4] Y. P. Wu, C. Y. Jiang, C. R. Wan, S. B. Fang, Y. Y. Jiang, *J Appl Polym Sci.* 2000, 77, 1735.

[5] X. R. Wang, X. L. Li, L. Zhang, Y. Yoon, P. K. Weber, H. L. Wang, J. Guo, H. J. Dai, *Science* 2009, 324, 768.

[6] M. J. McAllister, J. L. Li, D. H. Adamson, H. C. Schniepp, A. A. Abdala, J. Liu, M. Herrera-Alonso, D. L. Milius, R. CarO, R. K. Prudhomme, I. A. Aksay, *Chem. Mater.* 2007, 19, 4396.

[7] J. Casanovas, J. M. Ricart, J. Rubio, F. Illas, J. M. Jimenez-Mateos, *J. Am. Chem. Soc.* 1996, 118, 8071.

[8] H. C. Choi, J. Park, B. N. Kim, *J. Phys. Chem. B* 2005, 109, 4333.

[9] M. Terrones, P. Redlich, N. Grobert, S. Trasobares, W. K. Hsu, H. Terrones, Y. Q. Zhu,

[10] Y. P. Wu, S. B. Fang, W. G. Ju, Y. Y. Jiang, *J. Power Sources* 1998, 70, 114.

[11] K. Naoi, N. Ogihara, Y. Igarashi, A. Kamakura, Y. Kusachi, K. Utsugi, *J Electrochem Soc.* 2005, 152, A1047.

[12] V. A. Sethuraman, L. J. Hardwick, V. Srinivasan, R. Kostecki, *J. Power Sources* 2010, 195, 3655.

[13] A. V. Murugan, T. Muraliganth, A. Manthiram, *Chem. Mater.* 2009, 21, 5004.

Although this disclosure has described and illustrated certain preferred embodiments of the invention, it is to be understood that the invention is not restricted to those particular embodiments. Rather, the invention includes all embodiments which are functional or mechanical equivalence of the specific embodiments and features that have been described and illustrated.

The embodiments of the invention in which an exclusive property or privilege is claimed are defined as follows:

1. A secondary lithium battery having an anode comprising graphene nanosheets doped with a doping element "M" to form a M-graphene nanosheet (M-GNS), wherein said doping element M is selected from the group consisting of nitrogen, boron, sulfur, phosphorus and combinations thereof, and said anode comprises 0.001 molar % to 30 molar %, of said doping element on said graphene basis.

2. A battery as claimed in claim 1 wherein said doped graphene nanosheets comprise a monolayer or multi-layer graphene.

3. A battery as claimed in claim 1 wherein said anode comprises a binder.

4. A battery as claimed in claim 3 wherein said binder is polyvinylidene fluoride.

5. A battery as claimed in claim 1 wherein said doped graphene nanosheets are agglomerated as a body in the form of a sheet, sphere or rod.

6. A battery as claimed in claim 1 wherein said anode comprises a conductive substrate coated with said M-GNS.

7. A battery as claimed in claim 6 wherein said substrate is metallic.

8. A battery as claimed in claim 1 selected from a secondary lithium ion battery, secondary solid lithium battery and secondary lithium polymer battery.

9. A process for making an anode for use in a battery as defined in claim 3 comprising mixing M-GNS with a binder.

10. A process as claimed in claim 9 comprising (i) coating a slurry comprising said M-GNS, a binder, a conductivity additive, and a solvent on a current collector or substrate; and (ii) drying and calendering said slurry coating.

* * * * *